(12) United States Patent
Walters et al.

(10) Patent No.: US 11,736,297 B2
(45) Date of Patent: Aug. 22, 2023

(54) SYSTEM AND METHOD FOR HASH VALUE CONFIRMATION OF ELECTRONIC COMMUNICATIONS

(71) Applicant: Capital One Services, LLC, McLean, VA (US)

(72) Inventors: Austin Walters, Savoy, IL (US); Mark Watson, Philadelphia, PA (US); Vincent Pham, Champaign, IL (US); Reza Farivar, Champaign, IL (US); Fardin Abdi Taghi Abad, Champaign, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 240 days.

(21) Appl. No.: 17/159,709

(22) Filed: Jan. 27, 2021

(65) Prior Publication Data
US 2022/0239493 A1 Jul. 28, 2022

(51) Int. Cl.
| | | |
|---|---|---|
| H04L 9/40 | (2022.01) | |
| H04L 9/32 | (2006.01) | |
| H04L 9/08 | (2006.01) | |
| H04W 4/80 | (2018.01) | |

(52) U.S. Cl.
CPC .......... *H04L 9/3234* (2013.01); *H04L 9/0825* (2013.01); *H04L 9/3236* (2013.01); *H04W 4/80* (2018.02); *H04L 2209/805* (2013.01)

(58) Field of Classification Search
CPC ... H04L 9/3234; H04L 9/0825; H04L 9/3236; H04L 2209/805
See application file for complete search history.

(56) References Cited

U.S. PATENT DOCUMENTS

| | | | |
|---|---|---|---|
| 7,024,395 B1 | 4/2006 | McCown et al. | |
| 10,158,491 B2 | 12/2018 | Bonsignore | |
| 10,475,024 B1* | 11/2019 | von Behren | G06Q 20/204 |
| 10,785,026 B2* | 9/2020 | Ashley | H04L 9/30 |
| 2006/0002558 A1* | 1/2006 | Rekimoto | H04L 9/0662 |
| | | | 380/270 |
| 2009/0214038 A1* | 8/2009 | Wong | G06K 7/0008 |
| | | | 380/270 |
| 2014/0281510 A1* | 9/2014 | Buruganahalli | H04L 63/1408 |
| | | | 713/164 |
| 2020/0084034 A1 | 3/2020 | Atmopawiro et al. | |
| 2020/0388357 A1* | 12/2020 | Johnson | H04L 9/3239 |

* cited by examiner

*Primary Examiner* — Thaddeus J Plecha
(74) *Attorney, Agent, or Firm* — Perkins Coie LLP (57) ABSTRACT

Systems, methods, and computer-readable storage media for ensuring electronic communications have not been intercepted and manipulated. An exemplary device generates a public/private pair of keys, and transmits the public key to another device with information about the data to be shared. The second device encrypts associated data, while also executing a hash function on at least a portion of the data. The first device receives the encrypted data, decrypts it, and verifies its accuracy using a third party. The third party also executes the hash function on the data received from the first device, and transmits the output of that hash function to the first device. Both the first device and second devices and display the hash values, allowing users to visually determine if the data has been manipulated during the transaction.

19 Claims, 5 Drawing Sheets

SYSTEM AND METHOD FOR HASH VALUE CONFIRMATION OF ELECTRONIC COMMUNICATIONS

BACKGROUND

1. Technical Field

The present disclosure relates to a secure electronic communication system, and more specifically to an electronic communication system using hash values to ensure that the electronic communications are not altered or manipulated by an intermediary.

2. Introduction

Electronic communications are frequently intercepted and manipulated without a user's knowledge. For example, an electronic signal being relayed from points "A" to "B" can be modified by the relay without the originators at "A" or the recipients at "B" realizing the signal has been changed. Likewise, credit card skimmers often intercept credit card information and modify the amount being charged, increasing the amount charged only slightly so that the card owner is unaware that they are being charged extra. Phone-to-phone communications may be modified by a rogue computer program or app, without the users being aware of the modification.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A smart card verification system for performing the concepts disclosed herein can include: a smart card including a display, a calculating device and a memory storing account information associated with the smart card; a receiver having a display, a receptacle configured to accept the smart card and a processor, wherein, upon physical insertion of the smart card into the receiver to conduct a transaction, an electrical connection is made between the smart card and the receiver which initiates operations comprising: generating, with the processor of the receiver, encryption tokens comprising a public key paired with a private key; transmitting transaction information and the public key from the receiver to the smart card via the electrical connection; encrypting, via a processor of the smart card using the public key, the account information associated with the smart card, resulting in encrypted account information; generating a smart card hash value by the calculating device of the smart card executing a hashing algorithm, where inputs to the hashing algorithm comprise the account information and the transaction information; transmitting the encrypted account information from the smart card to the receiver via the electrical connection; decrypting the encrypted account information via the processor at the receiver using the private key, resulting in decrypted account information; transmitting, from the receiver to an issuer of the smart card, the decrypted account information and the transaction information; receiving at the receiver from the issuer an issuer hash value calculated using the hashing algorithm, where the inputs to the hashing algorithm comprise the decrypted account information and the transaction information, and an approval decision for the transaction; displaying the issuer hash value on the display of the receiver; and displaying the smart card hash value on the display of the smart card.

A method for performing the concepts disclosed herein can include: detecting, via a card detection sensor within a receiver, insertion of a smart card into the receiver to create a physical connection between the receiver and the smart card; generating, via a processor of the receiver, a public encryption key, the public encryption key being associated with a private key generated by the processor of the receiver; transmitting, when the card detection sensor detects an insertion of the smart card, the public encryption key from the receiver to the smart card inserted in the receiver; transmitting, from the receiver to the smart card, transaction information for a transaction; receiving, at the receiver from the smart card, encrypted data, the encrypted data being encrypted using the public encryption key and comprising account information associated with the smart card; decrypting, via the processor of the receiver using the private key, the encrypted data, resulting in decrypted account data; transmitting, from the receiver to an issuer of the smart card, a request for approval of the transaction, the request comprising the transaction information and the decrypted account data; receiving, in response to the request from the issuer, an approval of the transaction and an issuer hash value, the issuer hash value generated using a hashing process with inputs of the transaction information and the decrypted account data; receiving, via a wireless communication, a smart card hash value, the smart card hash value generated using the hashing process executed by a processor on the smart card with inputs to the hashing process comprising the transaction information and the account information; and comparing, via the processor of the receiver, the issuer hash value to the smart card hash value.

A system configured to perform concepts disclosed herein can include: a processor; a wireless transmitter; a wireless receiver; a display; and a non-transitory computer-readable storage medium having instructions stored which, when executed by the processor, cause the processor to perform operations comprising: receiving, via the wireless receiver, a request from a wireless device to exchange data; transmitting, via the wireless transmitter to the wireless device, a public key; receiving, via the wireless receiver from the wireless device, encrypted data, wherein the encrypted data was original data which was encrypted by a processor of the wireless device using the public key; decrypting, via the processor and using a private key, the encrypted data, resulting in unencrypted data; executing, via the processor, a hash algorithm using the unencrypted data as an input, resulting in a first hash value; and displaying the first hash value on the display while a second hash value is displayed on a display of the wireless device, the second hash value generated by the processor of the wireless device executing the hash algorithm with the original data as input to the hash algorithm.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The disclosed systems and methods overcome the technical problems associated with electronic signal interception and manipulation. More specifically, the disclosed systems and methods send and receive electronic communications and use hash value outputs to allow for confirmation that electronically communicated data has not been altered by any intermediaries. In some configurations this confirmation can be provided visually, with both the transmitting electronic system and the receiving electronic system separately generating and displaying hash values for the content being communicated such that a user can visually verify that the content has not been altered or otherwise modified. In other configurations, confirmation of hash values can be made using a communication channel which is distinct from the channel used for the original communication (e.g., using a near-field communication [NFC] if a physical communication was used originally, or vice versa).

Consider the following example, where a user with a smart card is interacting with a receiving device. In this example, the smart card is a physical card, with non-transitory computer-readable memory, a processor, and a display device built into the card. Other examples of where the disclosed systems and methods can improve electronic communication exchanges include smartphone to smartphone communications, laptop to laptop communications, or any other electronic device to another electronic device.

In this example, with a smart card and a receiver, the user inserts the smart card into the receiver to initiate a communication. Upon inserting the smart card, a physical electrical circuit is completed, with one or more contact points of the smart card physically connecting with one or more contact points of the receiver. The interface between the smart card and the receiver may also be wireless. As part of the communication the receiver may transmit first information to the smart card using the physical circuit while also requesting information, such as account information, from the smart card. The receiver also generates a public/private key combination which can be used to encrypt data specific to the electronic communication with the smart card and sends the public key to the smart card using the physical circuit.

The smart card, having memory, receives the first information and a public key, and saves both to different addresses within the memory (such as distinct addresses within a temporary cache). The processor retrieves, from a different location within the memory, the account information and encrypts the account information using the public key received from the receiver. Electronic signals including the encrypted account information is then sent back to the receiver from the processor of the smart card. The smart card processor also executes a hash algorithm, using the first information as the input to the hash algorithm. The resulting hash value is stored in the smart card's memory and may also be displayed on the smart card's display.

The receiver, upon receiving the encrypted account information, uses its private key to decrypt the encrypted account information, then transmits electronic signals including the decrypted account information for verification, for example by sending the electronic signals over a network to an issuer of the smart card. The receiver in this example also transmits the first information to the issuer.

The issuer, upon receiving the request to verify the smart card, can send electronic signals indicating an approval to the receiver. In addition, the issuer can execute the same hash algorithm executed by the smart card, where the first information is again used as the input to the hash algorithm. The resulting hash value is then transmitted from the issuer to the point-of-sale device.

The two hash values may be compared to detect changes to the electronic signals, for example changes made to the first information. The comparison may be done automatically. In another example, the receiver, upon receiving approval from the issuer, can also display the hash value received from the issuer on a display which is part of the receiver. The hash value displayed on the smart card can be verified to match the hash value displayed on the receiver. In this manner, it can be detected there was an interception and alteration of the electronic signals representing first the information sent between the smart card and the receiver.

In some configurations, the hash value generated by the issuer can be communicated to the smart card using a different communication channel or mechanism. For example, in the example given above, the receiver can, using a Near Field Communication (NFC) device (such as a Bluetooth antenna and communication system), wirelessly transmit the issuer-generated hash value to the smart card. The smart card can then, also using an NFC system, receive the wirelessly-transmitted issuer-generated hash value and compare that issuer-generated hash value to the hash value generated by the smart card using the smart card processor. If the two hash values match, the smart card can display an approval or other indication that the first information has not been manipulated.

In another example, if two smart phones or other wireless communication devices are transferring data, a first device can generate a public/private key combination for encryption/decryption, and wirelessly transmit the public key to the second device. The second device can execute a hash algorithm on the data being transferred, then encrypt the data and transmit the encrypted data to the first device. The second device can decrypt the data and execute the same hash algorithm. In some configurations, the hash algorithm can be provided by a third party (such as the create of an app or computer program), and that hash algorithm can be updated or modified at a given frequency or for a given interaction. For example, the hash algorithm could vary from interaction to interaction, with the third party providing a new variation of the hash algorithm for each interaction.

These and other examples will be further discussed with respect to the Figures.

Figure 1:
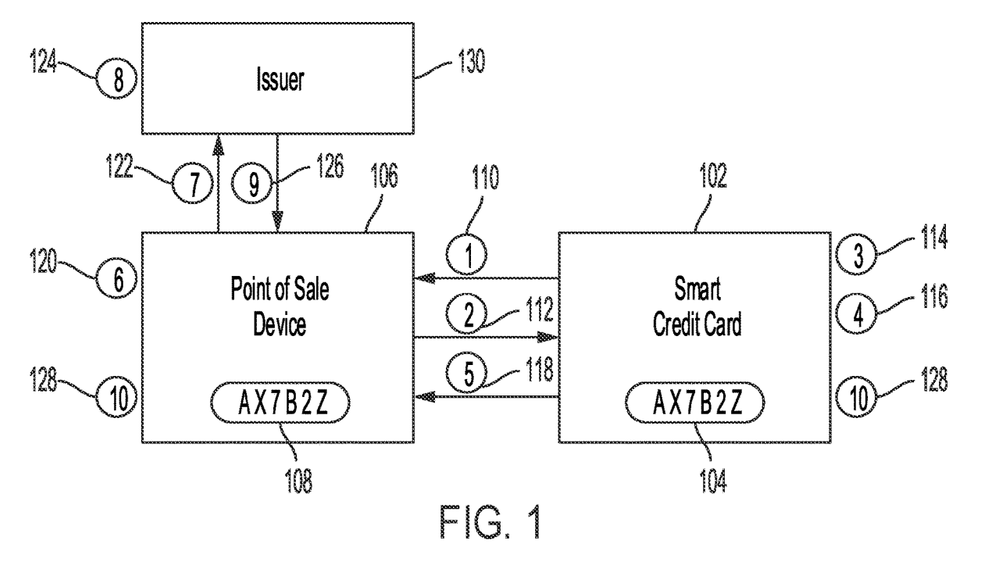
FIG. 1 illustrates a first example system embodiment.

FIG. 1 illustrates a first example system embodiment. In this example, a smart credit card 102 is inserted (1) 110 into a point of sale device 106. The point of sale device 106 transmits (2) 112 a public key and transaction information to the smart credit card 102. The smart credit card 102, using a calculating device (such as a processor with software, a hard-wired chip such as an ASIC (Application Specific Integrated Circuit), a non-generic processor specifically configured to execute hash algorithms and encrypt data stored in memory, etc.) built into the smart credit card 102, executes a hash algorithm (3) 114 using the transaction information as input. The hash value output from that hash algorithm (3) 114 can be displayed 104 on a display of the smart credit card 102. The calculating device can also encrypt (4) 116 account information stored on the smart credit card 102 and transmit (5) 118 that encrypted account information to the point of sale device 106.

The point of sale device 106, using a processor, can use a private key to decrypt (6) 120 the encrypted account information received from the smart credit card 102. The point of sale device 106 can then transmit (7) 122 the decrypted account information and the transaction amount to an issuer 130 of the smart credit card 102 with a request to approve the transaction. The issuer 130 can verify that the account associated with the smart credit card 102 is authorized to complete the transaction. The issuer 130 also executes the hash algorithm (8) 124 on the transaction amount, and transmits (9) 126 the issuer generated hash value to the point of sale device 106.

The point of sale device 106 then receives the hash value received from the issuer 130, and displays (10) 128 the issuer-generated hash value on a display 108. The owner of the smart credit card 102 can then verify, based on the hash values matching, that the amount being charged for the transaction has not been modified by a skimmer device or other intermediary device. Employees or others can likewise verify the hash values displayed 104, 108 on the smart credit card 102 and the point of sale device 106 match. Both hash values may also be provided to the smart card or the point of sale device and the comparison may be done by the smart card or the point of sale device.

Figure 2:
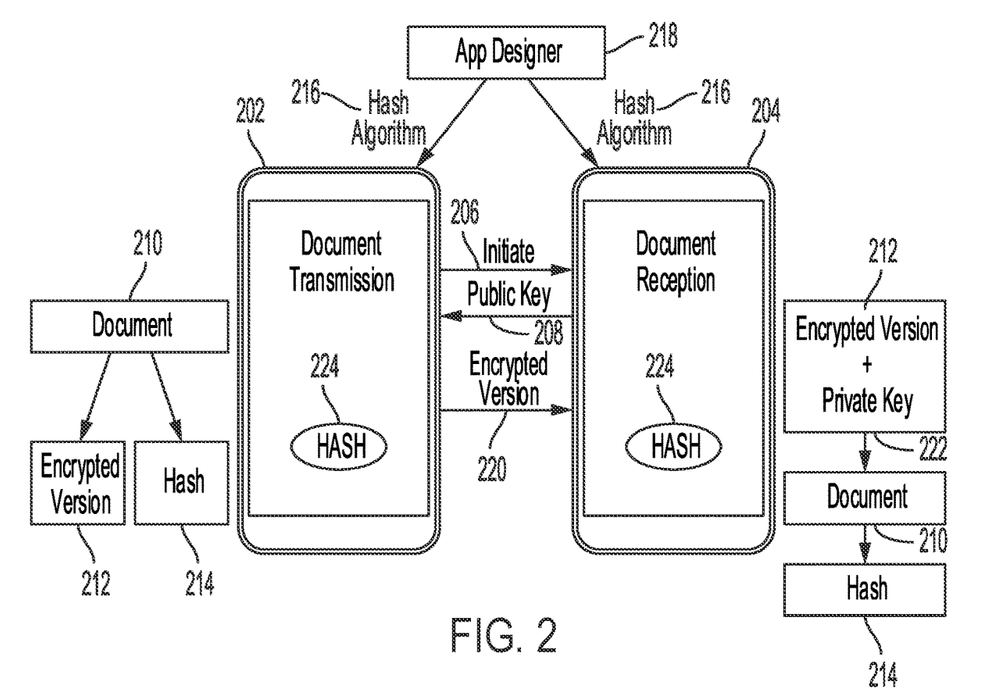
FIG. 2 illustrates a second example system embodiment.

FIG. 2 illustrates a second example system embodiment. In this example, a first smart device 202 (such as a smart phone, tablet, laptop, etc.) communicates with a second smart device 204 to exchange data. The first device 202 initiates 206 the exchange, and the second device 204 responds with a public key 208 which has an associated private key which is not transmitted. The first device 202 uses the public key to encrypt information, such as a document 210, generating an encrypted version 212. The first device 202 also executes a hash algorithm 216 which is received from an app designer 218 (or other third party), using the document 210 as input to the hash algorithm 216, resulting in a hash value 214.

The encrypted version 212 is transmitted 220 to the second device 204, and the second device 204 can use the private key to decrypt 222 the encrypted version 212, resulting in a decrypted document 210. The second device 204 can then execute the hash algorithm 216 on the decrypted document 210, resulting in another hash value output 214. The first device 202 and the second device 204 can then respectively display 224 their respective hash values 214, allowing the users of both devices 202, 204 to verify the transfer of the data was not improperly modified. Both hash values may also be provided to one of the devices and the comparison may be done by that device.

Figure 3:
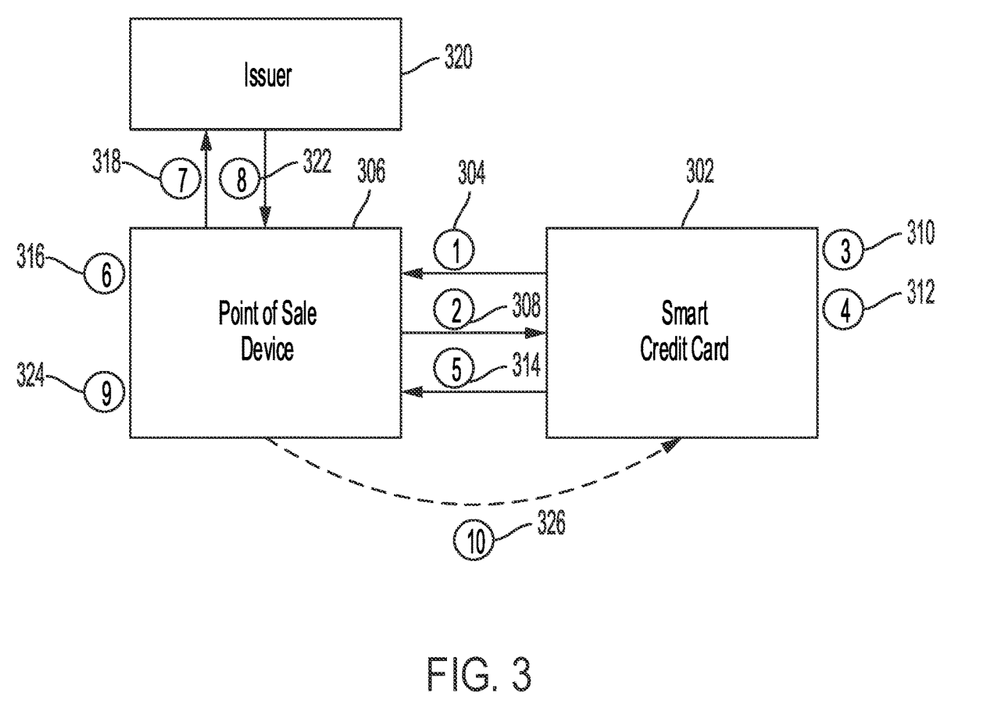
FIG. 3 illustrates a third example system embodiment.

FIG. 3 illustrates a third example system embodiment. In this example, a smart credit card 302 is inserted (1) 304 into a receiver, such as point of sale device 306, forming a physical circuit between the point of sale device 306 and the smart credit card 302. The interface between the smart card and the receiver may also be wireless. The point of sale device 306 transmits (2) 308 a public key and transaction information to the smart credit card 302. The smart credit card 302, using a calculating device (such as a processor with software, a hard-wired chip such as an ASIC (Application Specific Integrated Circuit), etc.) built into the smart credit card 302, executes a hash algorithm (3) 310 using the transaction information as input. The hash value output from that hash algorithm can be stored within memory of the smart credit card 302. The calculating device can also encrypt (4) 312 account information stored on the smart credit card 302 and transmit (5) 308 that encrypted account information to the point of sale device 306.

The point of sale device 306, using a processor, can use a private key to decrypt (6) 316 the encrypted account information received from the smart credit card 302. The point of sale device 306 can then transmit (7) 318 the decrypted account information and the transaction amount to an issuer 320 of the smart credit card 302 with a request to approve the transaction. The issuer 320 can verify that the account associated with the smart credit card 302 is authorized to complete the transaction. The issuer 320 can also execute the hash algorithm using the transaction amount as input, and transmit (8) 322 the issuer generated hash value and approval of the sale to the point of sale device 306.

The point of sale device 106 then receives (9) 324 the hash value and the transaction approval from the issuer 320, and transmits (10) 326 the issuer-generated hash to the smart credit card 302 using a different communication channel or mechanism than used for the previous communications 304, 308, 314. For example, if the original communications 304, 308, 314 took place using a physical circuit, the different communications channel (10) 326 can be a wireless signal on a wireless channel, or vice versa. The smart credit card 302 can then verify, using the calculating device or processor built into the smart credit card 302, that the hash values match, indicating that the amount being charged for the transaction has not been modified by a skimmer device or other intermediary device. The smart credit card 302 can then indicate, through a display or other mechanism, that the issuer-generated hash value which was wirelessly (or communicated through a secondary channel) matches the hash value generated by the smart credit card 302, thereby informing the user.

Figure 4:
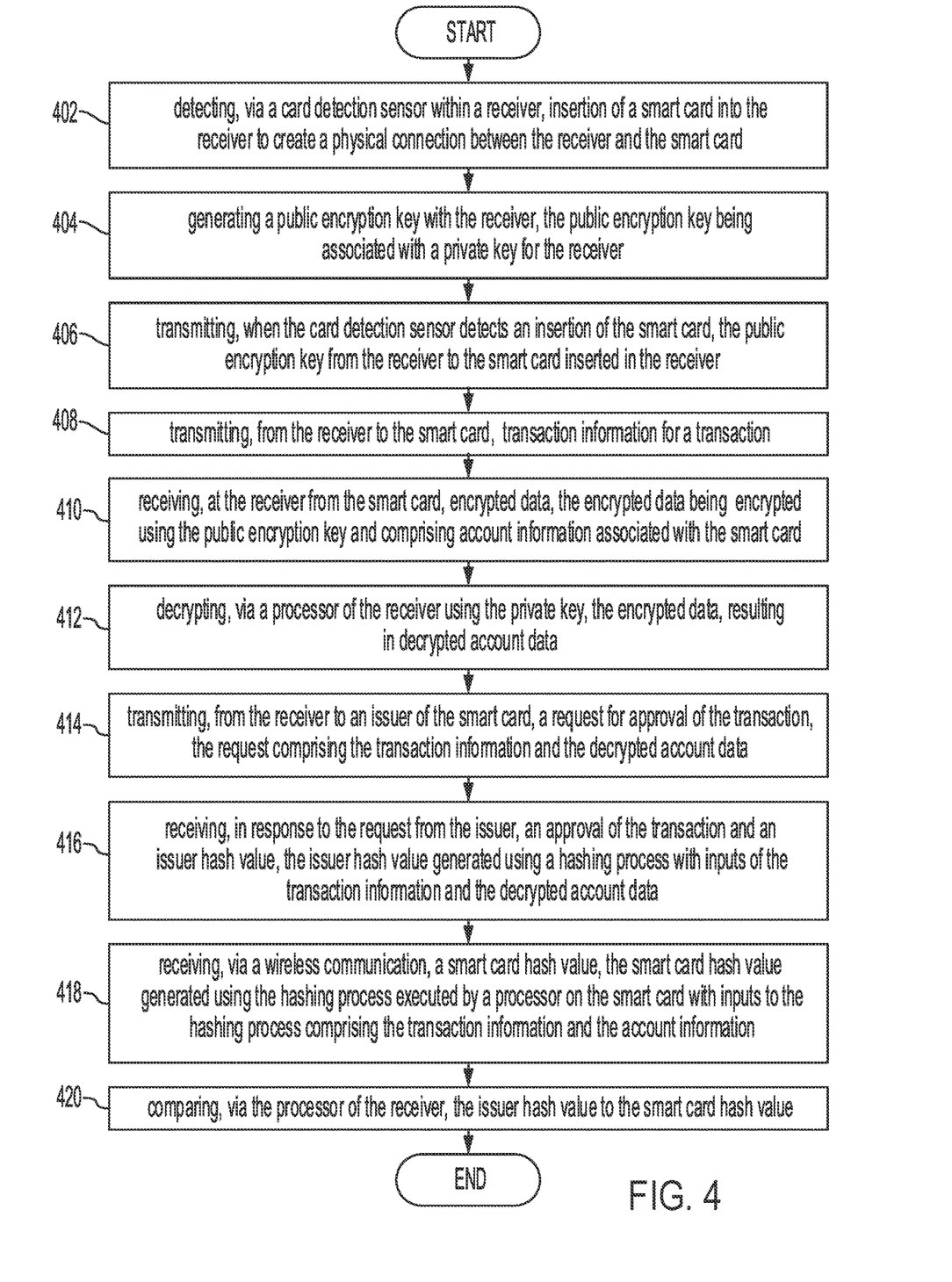
FIG. 4 illustrates an example method embodiment.

FIG. 4 illustrates an example method embodiment which can be performed by a computer system. The method can include detecting, via a card detection sensor within a receiver, insertion of a smart card into the receiver to create a physical connection between the receiver and the smart card (402) and generating a public encryption key with the receiver, the public encryption key being associated with a private key for the receiver (404). The system transmits, when the card detection sensor detects an insertion of the smart card, the public encryption key from the receiver to the smart card inserted in the receiver (406) and transmits, from the receiver to the smart card, transaction information for a transaction (408). The system receives, at the receiver from the smart card, encrypted data, the encrypted data being encrypted using the public encryption key and comprising account information associated with the smart card (410) and decrypts, via a processor of the receiver using the private key, the encrypted data, resulting in decrypted account data (412). The system transmits, from the receiver to an issuer of the smart card, a request for approval of the transaction, the request comprising the transaction information and the decrypted account data (414) and receives, in response to the request from the issuer, an approval of the transaction and an issuer hash value, the issuer hash value generated using a hashing process with inputs of the transaction information and the decrypted account data (416). The system then receives, via a wireless communication, a smart card hash value, the smart card hash value generated using the hashing process executed by a processor on the smart card with inputs to the hashing process comprising the transaction information and the account information (418) and compares, via the processor of the receiver, the issuer hash value to the smart card hash value (420).

In some configurations, the issuer hash value can be displayed on a display of the receiver. In such configurations, the smart card can display the smart card hash value via a smart card display.

In some configurations, the smart card can include: the processor on the smart card; and a card display. The processor on the smart card can be a non-generic processor configured to execute the hashing process and display an output of the hashing process on the card display. In such configurations, a card skimmer located between the receiver and the smart card can cause the issuer hash value received and the smart card hash value to be distinct.

In some configurations, the illustrated method can further include displaying, on the display of the receiver, a notification based on the comparing of the issuer hash value to the smart card hash value. In such cases, the method can also include transmitting to the smart card, via a second wireless communication, the issuer hash value, wherein the smart card also performs the comparing of the issuer hash value to the smart card hash value.

In some configurations, the public encryption key can vary according to an undisclosed frequency. For example, the public encryption key can vary every twelve hours, every two days, etc.

In some configurations, the method can be initiated upon the card detection sensor detecting an insertion of the smart card.

Figure 5:
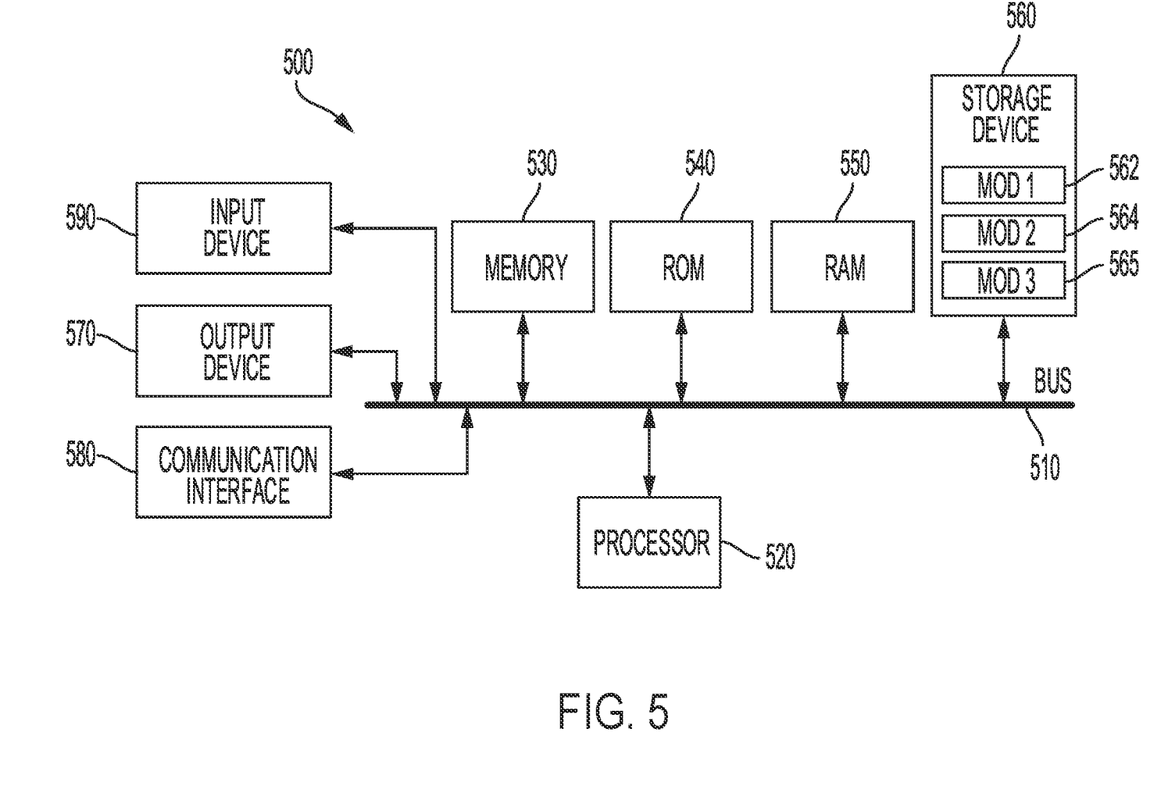
FIG. 5 illustrates an example computer system.

With reference to FIG. 5, an exemplary system includes a general-purpose computing device or system 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A smart card verification system, comprising:
a smart card including a display, a calculating device and a memory storing account information associated with the smart card;
a receiver having a display, a receptacle configured to accept the smart card and a processor, wherein, upon physical insertion of the smart card into the receiver to conduct a transaction, an electrical connection is made between the smart card and the receiver which initiates operations comprising:
generating, with the processor of the receiver, encryption tokens comprising a public key paired with a private key;
transmitting transaction information and the public key from the receiver to the smart card via the electrical connection;
encrypting, via a processor of the smart card using the public key, the account information associated with the smart card, resulting in encrypted account information;
generating a smart card hash value by the calculating device of the smart card executing a hashing algorithm, where inputs to the hashing algorithm comprise the account information and the transaction information;
transmitting the encrypted account information from the smart card to the receiver via the electrical connection;
decrypting the encrypted account information via the processor at the receiver using the private key, resulting in decrypted account information;
transmitting, from the receiver to an issuer of the smart card, the decrypted account information and the transaction information;
receiving at the receiver from the issuer an issuer hash value calculated using the hashing algorithm, where the inputs to the hashing algorithm comprise the decrypted account information and the transaction information, and an approval decision for the transaction;
displaying the issuer hash value on the display of the receiver; and
displaying the smart card hash value on the display of the smart card.

2. The smart card verification system of claim 1, wherein the operations further comprise:
transmitting, from the receiver to the smart card via a wireless connection, the issuer hash value;
comparing the issuer hash value to the smart card hash value using the calculating device of the smart card, resulting in a comparison; and
displaying, on the display of the smart card, a result of the comparison.

3. The smart card verification system of claim 1, wherein the operations further comprise:
transmitting, from the smart card to the receiver via a wireless connection, the smart card hash value;
comparing the issuer hash value to the smart card hash value using the processor of the receiver, resulting in a comparison; and
displaying, on the display of the receiver, a result of the comparison.

4. A method comprising:
detecting, via a card detection sensor within a receiver, insertion of a smart card into the receiver to create a physical connection between the receiver and the smart card;
generating, via a processor of the receiver, a public encryption key, the public encryption key being associated with a private key generated by the processor of the receiver;
transmitting, when the card detection sensor detects an insertion of the smart card, the public encryption key from the receiver to the smart card inserted in the receiver;
transmitting, from the receiver to the smart card, transaction information for a transaction;
receiving, at the receiver from the smart card, encrypted data, the encrypted data being encrypted using the public encryption key and comprising account information associated with the smart card;
decrypting, via the processor of the receiver using the private key, the encrypted data, resulting in decrypted account data;
transmitting, from the receiver to an issuer of the smart card, a request for approval of the transaction, the request comprising the transaction information and the decrypted account data;
receiving, in response to the request from the issuer, an approval of the transaction and an issuer hash value, the issuer hash value generated using a hashing process with inputs of the transaction information and the decrypted account data;
receiving, via a wireless communication, a smart card hash value, the smart card hash value generated using the hashing process executed by a processor on the smart card with inputs to the hashing process comprising the transaction information and the account information; and
comparing, via the processor of the receiver, the issuer hash value to the smart card hash value.

5. The method of claim 4, wherein the issuer hash value is displayed on a display of the receiver.

6. The method of claim 5, wherein the smart card displays the smart card hash value via a smart card display.

7. The method of claim 4, wherein the smart card comprises:
the processor on the smart card; and
a card display.

8. The method of claim 7, wherein the processor on the smart card is a non-generic processor configured to execute the hashing process and display an output of the hashing process on the card display.

9. The method of claim 8, wherein a card skimmer located between the receiver and the smart card causes the issuer hash value received and the smart card hash value to be distinct.

10. The method of claim 4, further comprising:
displaying, on a display of the receiver, a notification based on the comparing of the issuer hash value to the smart card hash value.

11. The method of claim 10, further comprising:
transmitting to the smart card, via a second wireless communication, the issuer hash value, wherein the smart card also performs the comparing of the issuer hash value to the smart card hash value.

12. The method of claim 4, wherein the public encryption key varies according to an undisclosed frequency.

13. The method of claim 4, wherein the method is initiated upon the card detection sensor detecting an insertion of the smart card.

14. A system comprising:
a processor;
a wireless transmitter;
a wireless receiver;
a display; and
a non-transitory computer-readable storage medium having instructions stored which, when executed by the processor, cause the processor to perform operations comprising:
receiving, via the wireless receiver, a request from a wireless device to exchange data;
transmitting, via the wireless transmitter to the wireless device, a public key;
receiving, via the wireless receiver from the wireless device, encrypted data, wherein the encrypted data was original data which was encrypted by a wireless device processor of the wireless device using the public key;
decrypting, via the processor and using a private key, the encrypted data, resulting in unencrypted data;
executing, via the processor, a hash algorithm using the unencrypted data as an input, resulting in a first hash value, wherein the hash algorithm is provided to the system and the wireless device by a third party; and
displaying the first hash value on the display while a second hash value is displayed on a display of the wireless device, the second hash value generated by the wireless device processor executing the hash algorithm with the original data as input to the hash algorithm.

15. The system of claim 14, wherein the public key and the private key are generated by the processor.

16. The system of claim 14, wherein the wireless device further comprises:
wireless device memory;
a wireless device wireless transmitter; and
a wireless device wireless receiver.

17. The system of claim 14, wherein the wireless device uses Near Field Communications (NFC) to transmit the encrypted data using a first channel.

18. The system of claim 17, the non-transitory computer-readable storage medium having additional instructions stored which, when executed by the processor, cause the processor to perform operations comprising:
receiving, from the wireless device using a second channel, a calculated hash value;
comparing, via the processor, the first hash value to the calculated hash value, resulting in a comparison; and
displaying, on the display, a notification based on the comparison.

19. The system of claim 18, the non-transitory computer-readable storage medium having additional instructions stored which, when executed by the processor, cause the processor to perform operations comprising:
transmitting, to the wireless device using the second channel, the first hash value, wherein the displaying of the notification based on the comparison occurs while the wireless device displays a second notification based on a second comparison of the calculated hash value to the first hash value, the second comparison executed by the wireless device processor.

* * * * *